United States Patent [19]

Payne et al.

[11] Patent Number: 4,823,854
[45] Date of Patent: Apr. 25, 1989

[54] SAFETY TIRE AND RIM COMBINATION WITH SAFETY INSERT

[75] Inventors: Roger E. Payne, Okemos; J. Bruce Weeks, Eaton Rapids, both of Mich.

[73] Assignee: Motor Wheel Corporation, Lansing, Mich.

[21] Appl. No.: 129,050

[22] Filed: Dec. 7, 1987

Related U.S. Application Data

[63] Continuation-in-part of Ser. No. 822,832, Jan. 27, 1986, abandoned.

[51] Int. Cl.⁴ .................. B60B 21/10; B60C 17/00
[52] U.S. Cl. ............................. 152/382; 152/399; 152/516
[58] Field of Search ............ 152/399, 401, 402, 405, 152/158, 516, 517, 520, DIG. 10, 382, 383

[56] References Cited

U.S. PATENT DOCUMENTS

| | | | |
|---|---|---|---|
| 2,040,645 | 5/1936 | Dickinson | 152/10 |
| 2,241,858 | 5/1941 | Hruska | 152/158 |
| 3,142,326 | 7/1964 | Lindeey | 152/158 |
| 3,392,772 | 7/1968 | Powers | 152/158 |
| 3,394,749 | 7/1968 | Lindley | 152/158 |
| 3,509,928 | 5/1970 | Aghnides | 152/158 |
| 3,682,218 | 8/1972 | Johannsen et al. | 152/158 |
| 3,872,907 | 3/1975 | Curtiss, Jr. et al. | 152/158 |
| 3,903,947 | 9/1975 | French et al. | 152/330 L |
| 3,918,508 | 11/1975 | Mitchell | 152/400 X |
| 4,091,854 | 5/1978 | French et al. | 152/158 |
| 4,163,466 | 8/1979 | Watts | 152/399 X |
| 4,197,849 | 12/1979 | Osada et al. | 152/520 X |
| 4,216,810 | 8/1980 | Osada et al. | 152/158 |
| 4,228,840 | 10/1980 | Okada | 152/400 |
| 4,318,435 | 3/1982 | Heath-Coleman | 152/400 X |
| 4,327,791 | 5/1982 | Strader | 152/401 X |
| 4,391,317 | 7/1983 | Savage | 152/516 |
| 4,393,911 | 7/1983 | Winfield | 152/158 |
| 4,467,852 | 8/1984 | Ippen et al. | 152/520 X |
| 4,481,997 | 11/1984 | Strader | 152/401 |
| 4,573,509 | 3/1986 | Smith et al. | 152/520 X |
| 4,674,549 | 6/1987 | Bush | 152/520 X |

FOREIGN PATENT DOCUMENTS

| | | |
|---|---|---|
| 169167 | 12/1951 | Austria . |
| 1262140 | 6/1968 | Fed. Rep. of Germany . |
| 1680402 | 6/1970 | Fed. Rep. of Germany . |
| 2637869 | 8/1976 | Fed. Rep. of Germany . |
| 269969 | 1/1934 | Italy . |

*Primary Examiner*—Robert B. Reeves
*Assistant Examiner*—Russell D. Stormer
*Attorney, Agent, or Firm*—Barnes, Kisselle, Raisch, Choate, Whittemore & Hulbert

[57] ABSTRACT

A runflat safety insert and safety tire and wheel assembly which include a take-apart multi-piece wheel rim and safety inserts extending circumferentially around the rim to clamp the tire bead toes against the rim bead flanges. The insert is a sheet metal annulus of generally channel shape in radial cross section open at its radially inner periphery between its side edges. The annular has a central bight portion extending generally axially and bounded by radially in-turned leg portions. The leg portions diverge relative to one another radially inwardly towards the tire bead toes and terminates in toe portions bearing generally flat against the interior surfaces of the tire toe beads. An elastomeric tread is bonded to the outer surface of the central bight portion. The annulus is made up of a pair of semi-circular members having interengageable mating ends releasably interconnected to form a complete annulus. The insert tread extends radially outwardly therefrom a predetermined distance to have a clearance with the interior surface of the tire under normal running conditions. The sheet metal annulus is axially compressed by the engagement of the tire bead toes with the channel toes so that the channel is stressed in direct opposition to stresses imposed on the same when the tire and rim combination is operated without inflation pressure in the tire chamber.

23 Claims, 4 Drawing Sheets

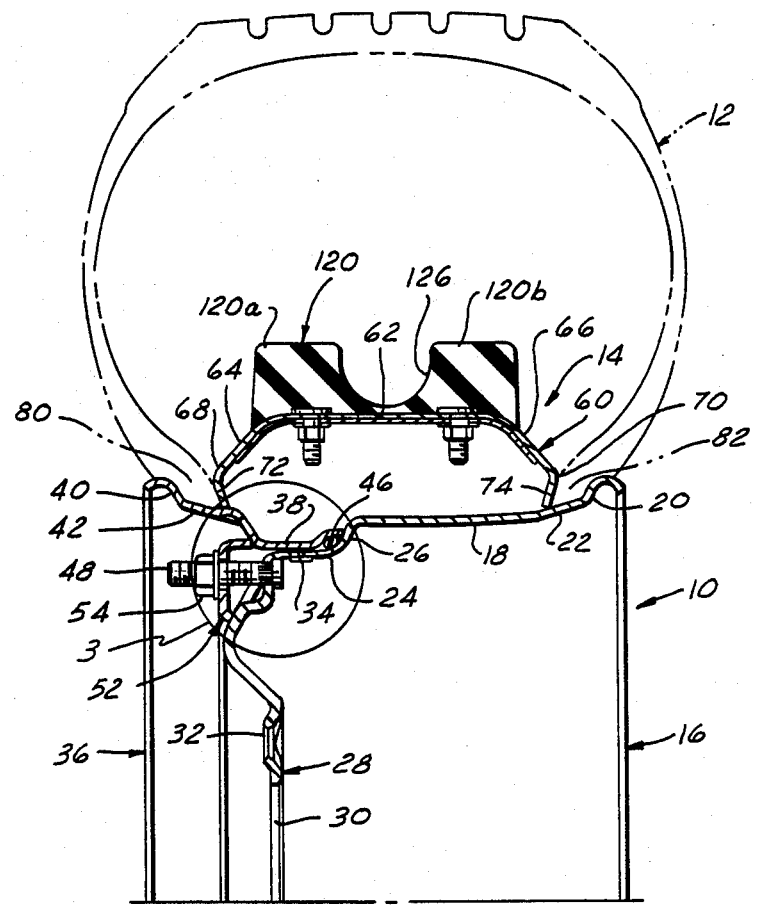
FIG. 1
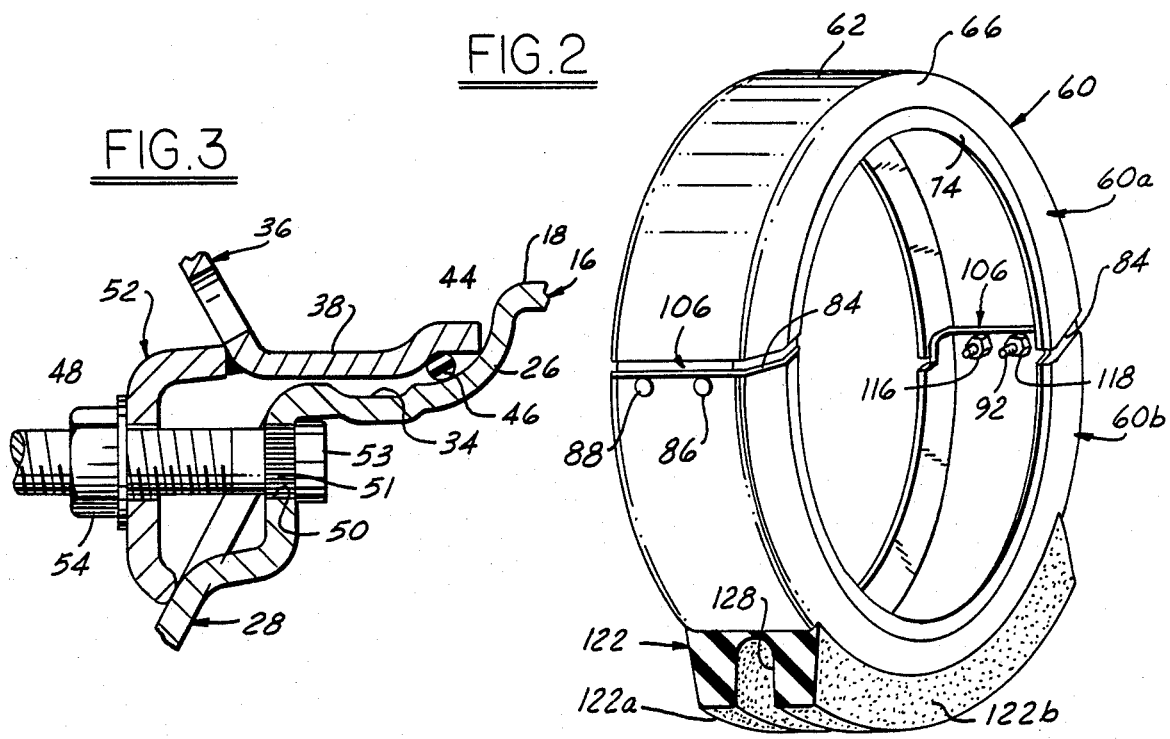
FIG. 2
FIG. 3

SAFETY TIRE AND RIM COMBINATION WITH SAFETY INSERT

This application is a continuation-in-part of copending patent application Ser. No. 822,832, filed Jan. 27, 1986, now abandoned.

The present invention relates to wheel assemblies for pneumatic tubeless tires, and, more particularly, to safety tire and wheel assemblies and methods of a type adapted for continued operation upon loss of air pressure in the tire.

During the last fifty years or more there have been many and diverse proposals for safety tire and wheel assemblies for preventing the collapse of a tire should the same, for any reason, become deflated. Those which have achieved the greatest degree of success are of the type wherein a safety insert device is adapted to be disposed internally of the tire mounted on a multi-piece rim of the type having a removable flange ring for mounting or demounting of the tubeless pneumatic tire thereon. In safety tire and wheel assemblies which include safety inserts of this type, the insert conventionally comprises a base portion disposed adjacent to the wheel rim and a second portion projecting radially from the rim into the tire cavity or air chamber. Upon loss of air pressure in the chamber, the tire tread collapses against the second portion of the insert, such that the insert supports the tire tread with respect to the rim for continued operation of the vehicle running under on-road or under off-road conditions. Such safety tire and wheel assemblies also conventionally include the provision of a solid or liquid lubricant in the tire chamber to help prevent heating and destruction of the tire and/or insert due to frictionally generated heat caused by relative motion between the tire tread and the tread-supporting portion of the safety insert.

A goal in the military vehicle art has been to provide a safety tire and wheel assembly which will operate at a vehicle speed of 30 m.p.h. over a distance of thirty miles following loss of tire pressure without destruction of the tire or wheel. Another goal is to accomplish this with a safety insert which can be field serviced as readily as factory installed. One successful solution to the problem in the severe applications required by military vehicles has been a safety tire and wheel assembly as described and claimed in U.S. Pat. No. 4,481,997 issued Nov. 13, 1984 in the name of Don S. Strader and assigned to the assignee herein, Motor Wheel Corporation of Lansing, Mich. This patent discloses an improved take-apart wheel rim assembly particularly adapted to handle the severe problems presented by high pressure track tires and the like for off road rugged terrain use. This wheel and rim assembly is constructed so as to prevent inflation of the tire mounted on the rim assembly when the rim assembly components are improperly positioned and/or which automatically vents the tire cavity to atmosphere should dis-assembly be attempted when the tire mounted thereon is inflated. The present invention is particularly directed to improvements in the safety insert for use on the aforementioned Strader multi-piece rim assembly.

In addition to the aforementioned Strader patent and the patents cited therein as references, other prior art attempts to provide safety inserts for safety tire and wheel assemblies having some resemblance to various aspects of the present invention may be found in the following U.S. and foreign patents:

| | | | |
|---|---|---|---|
| U.S. Pat. No. | 2,040,645 | 05/12/36 | Dickinson |
| U.S. Pat. No. | 2,241,858 | 05/13/41 | Hruska |
| U.S. Pat. No. | 3,142,326 | 07/28/64 | Lindley |
| U.S. Pat. No. | 3,392,772 | 07/16/68 | Powers |
| U.S. Pat. No. | 3,394,749 | 07/30/68 | Lindley |
| U.S. Pat. No. | 3,509,928 | 05/05/70 | Achnides |
| U.S. Pat. No. | 3,682,218 | 08/08/72 | Johannsen et al |
| U.S. Pat. No. | 3,872,907 | 03/25/75 | Curtiss et al |
| U.S. Pat. No. | 3,903,946 | 09/09/75 | French et al |
| U.S. Pat. No. | 4,091,854 | 05/30/78 | French et al |
| U.S. Pat. No. | 4,216,809 | 08/12/80 | Pixley |
| U.S. Pat. No. | 4,228,840 | 10/21/80 | Okada |
| U.S. Pat. No. | 4,318,435 | 03/09/82 | Heath-Coleman |
| U.S. Pat. No. | 4,346,747 | 08/31/82 | Osada et al |
| U.S. Pat. No. | 4,393,911 | 07/19/83 | Winfield |
| Austria | 169,167 | | |
| W. Germany | 1,262,140 | | |
| W. Germany | 1,680,402 | | |
| Italy | 269,969 | | |

However none of such prior art proposals would appear to provide a safety insert and safety tie and wheel assembly that utilizes such an insert which will fulfill all of the stated objects of the present invention in the manner of the present invention.

Accordingly, it is an object of the present invention to provide a safety tire and wheel assembly of standard construction having an improved safety insert adapted for use therein which is less expensive and lighter in weight than many safety insert assemblies of the prior art and which is capable of meeting military specification of ground speed and distance under runflat conditions.

Another object of the present invention is to provide a safety insert for a pneumatic tire and wheel assembly which is capable of withstanding sharp impacts simulated by spike test specifications so as to reduce or prevent damage to the tire under such conditions, such as when the same is driven at a high speed over sharp objects, such as rocks, scrap metal, etc.

A further object is to provide a safety insert of the aforementioned type which is economically adapted to a variety of applications so as basically to provide a beadlock to prevent slippage of the tire beads against the rim flanges as well as loss of tire from the rim under low pressure and/or runflat conditions, utilizing a common high strength-to-weight metal element for beadlock and one of a selected variety of rubber tire treads to accommodate low tire inflation applications as well as radial and bias tires to thereby obtain the economy of manufacture of a standardized component.

A further object of the present invention is to provide an improved safety insert of the aforementioned character which is relatively easy to manually mount and dismount, both in the factory and in the field, in a quick, simple and easy operation with only a wrench to assemble or remove nuts from studs.

Yet another object is to provide an improved safety insert of the aforementioned character which accomplishes the aforementioned objects at the lightest possible economic way to minimize the adverse effects that additional unsprung weight has upon vehicle dynamics, and afford air-transportability and high system performance as are specified particularly on military vehicles.

The invention, together with additional objects, features and advantages thereof, will be best understood from the following detailed description, the appended claims and the accompanying scaled drawings, in which:

FIG. 1 is a fragmentary sectional view taken in a radial plane coincident with the wheel axis of a presently preferred embodiment of the safety insert, tire and wheel assembly of the invention;

FIG. 2 is a perspective view illustrating the safety insert in assembly by itself, with a portion of a second embodiment of a tread shown fragmentarily thereon;

FIG. 3 is a fragmentary enlargement of the portion of FIG. 1 indicated by the circle labeled "3" therein;

Figure 4:
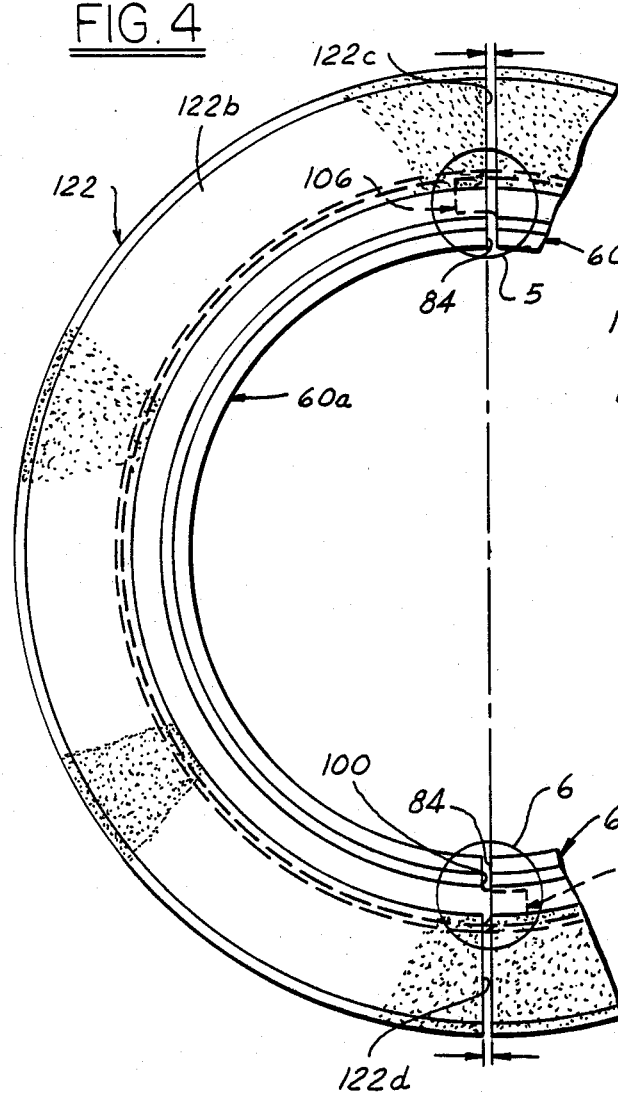
FIG. 4 is a fragmentary side elevational view of the safety insert with the second embodiment of tire tread thereon.
Figure 9:
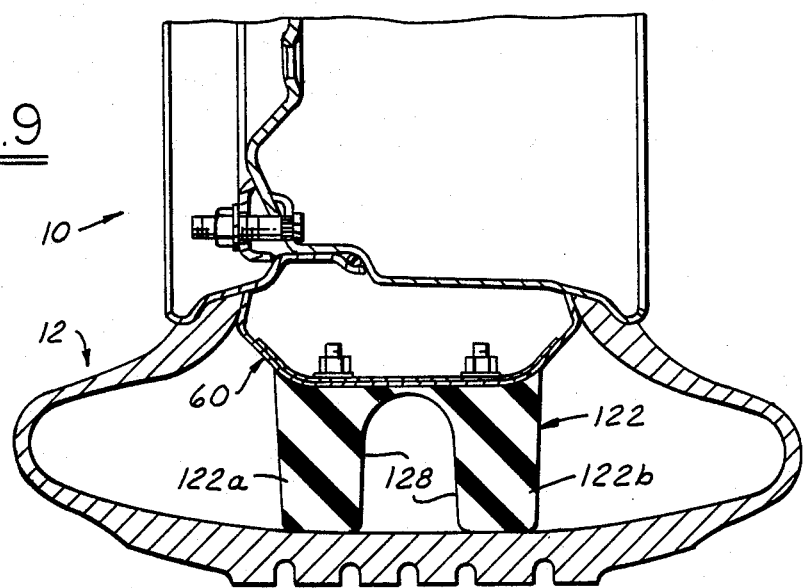
Figure 10:
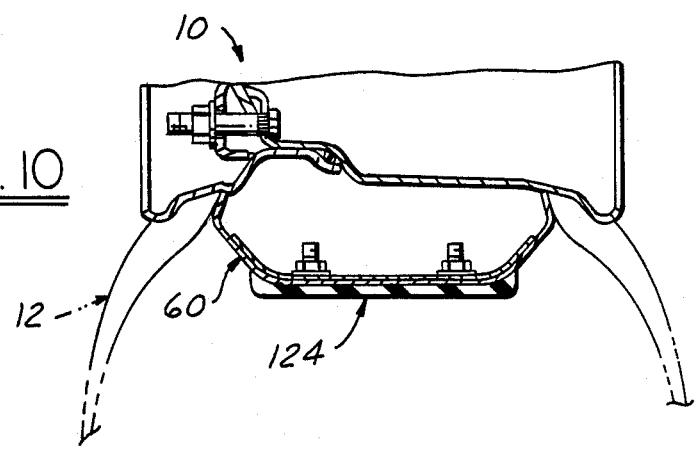

FIG. 9 is a fragmentary cross sectional view of the safety tire and wheel assembly utilizing the safety insert embodiment provided with the high profile tire tread embodiment of FIGS. 2 and 4, and illustrating the tire in a runflat condition at the ground engagement point; and FIG. 10 is a fragmentary sectional view taken on a radial plane illustrating the safety tire and wheel assembly with the safety insert provided with a third embodiment of a tire tread thereon.

Figure 11:
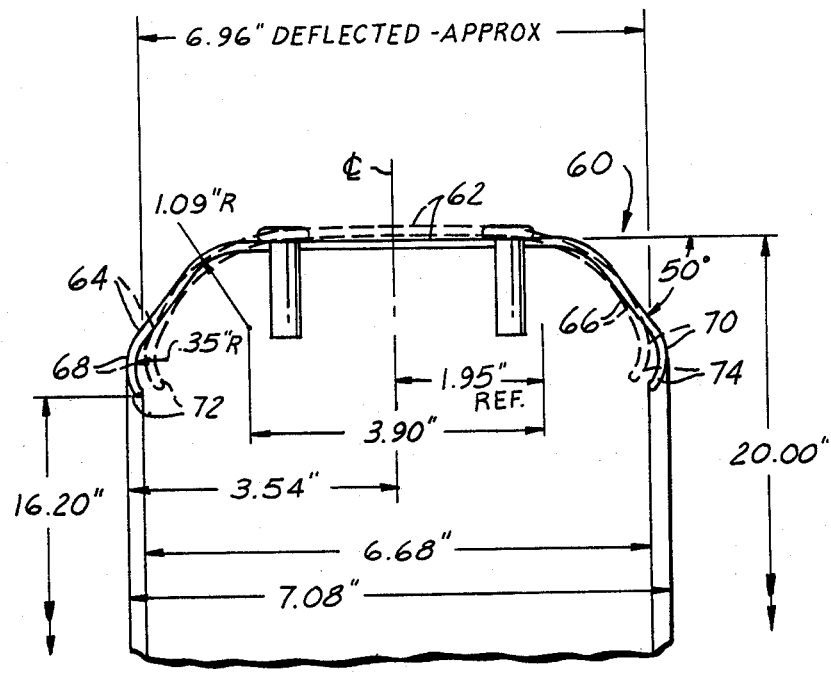

FIG. 11 is a fragmentary, part-sectional view similar to FIG. 8 but illustrating band 60 in an engineering drawing to scale as designed for one working example embodiment described in detail hereinafter, band 60 in its free state condition being shown in solid lines and phantom lines being superimposed to illustrate the deflection of band 60 when pre-stressed in assembly (on exaggerated scale) as described in more detail hereinafter, the actual part dimensions being shown in FIG. 11.

Figure 8:
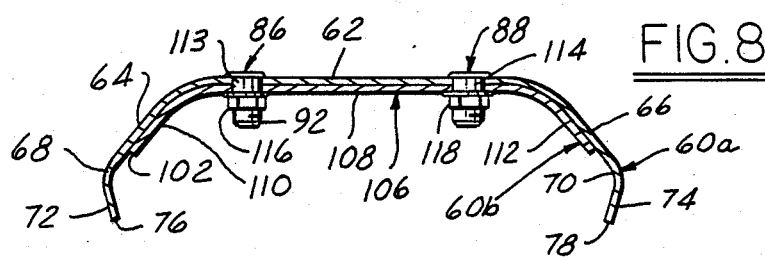
FIG. 8 is a sectional view taken on the line 8—8 of FIG. 7.
Figure 12:
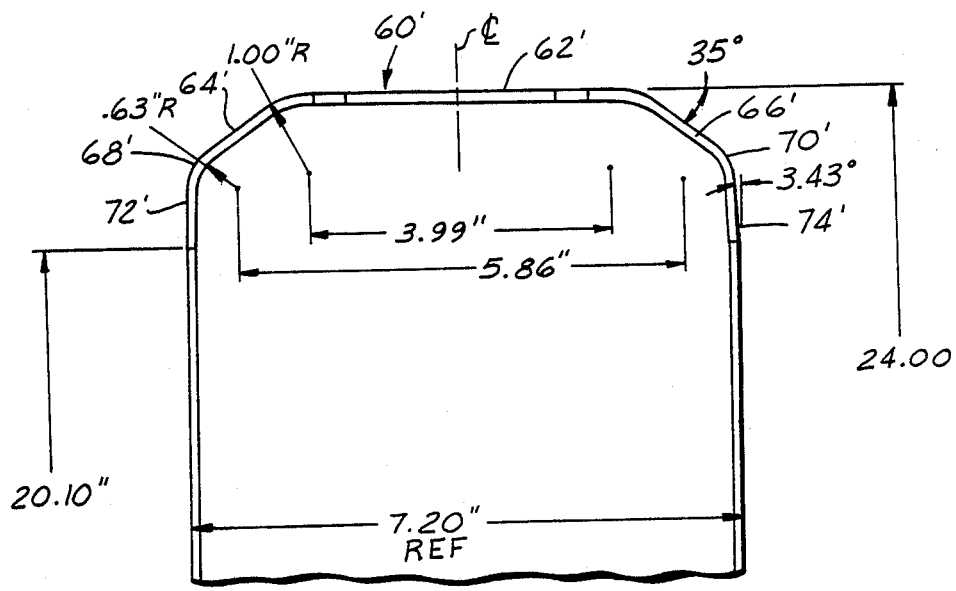

FIG. 12 is a sectional view similar to FIG. 8 but showing another embodiment of a band 60' as design engineered for use on a 20×10 rim to serve as a beadlock only in connection with a tire size designation 1400R20.

In the following description and claims, directional adjectives such as "inboard", and "outboard" are taken with reference to a preferred orientation of mounting of the wheel, etc. on a vehicle, and no undue limitations should be inferred therefrom where such directional adjectives are not essential to operation of the structural and functional features of the invention.

In general, the safety tire and wheel assembly of the invention features an improved safety insert in the form of a light weight, channel-shaped base/beadlock preferably made of thin sheet metal as semi-circular annuli segments releasably joined to form a complete annulus or hoop. The open side of the insert faces radially inwardly in assembly with the wheel rim and is configured in radial cross section so as to have a central bight portion bounded by radially inwardly diverging leg portions which merge with toe portions which in turn in one embodiment converge radially inwardly of the wheel toward each other. The free edges of the toe portions define the inner periphery of the annulus and are diametrical sized to have a slight clearance in assembly with the rim base when unloaded and which bear on the tire toe wall and/or the rim when axially compressed under a load. The free edges are compressed during assembly of the tire to the wheel to provide a beadlock function preventing slippage of the tire on the rim so that drive and braking torques are transmitted to the tire and to prevent unseating of the tire beads when operated in the deflated mode. The safety insert also features overlapping or telescopic tongue interengagement at the segment ends with apertures adapted for alignment to receive locking bolts.

The improved safety insert of the invention is constructed to provide compliancy to reduce tire damage in the event of impact or sudden deflation, with the sheet metal hoop constructed to serve as a common element for various embodiments of rubber tire treads affixed to the radially outwardly facing surface of the base/beadlock. The tire tread may be solid or may feature a circumferential center channel which separates the outer surface of the tire into a pair of axially spaced annular segments. The depth of the tire tread radially of the wheel is varied to suit different applications and tire constructions, as will be more apparent hereinafter. The sheet metal channel-shaped base/beadlock is also constructed to provide a self-locking feature of the tire beads to the rim flanges and bead seat which is operable to provide higher locking forces with higher loads simultaneous in timing and location to imposition of the load.

Referring in more detail to the accompanying drawings, FIG. 1 illustrates a presently preferred embodiment of a safety insert, tire and wheel assembly in accordance with the present invention which utilizes a multi-piece take-apart wheel and tire assembly substantially as disclosed and claimed in the aforementioned Strader U.S. Pat. No. 4,481,997, the same being incorporated herein by reference. Thus, FIG. 1 illustrates the Strader wheel assembly 10, and a tubeless pneumatic tire 12 mounted thereon, in combination with a first embodiment of a safety insert 14 of the present invention carried by wheel assembly 10 internally of tire 12 for supporting the latter in the event of tire deflation. Wheel assembly 10 includes a first rim segment 16 having a cylindrical rim base 18 and an inboard bead retaining flange 20 integrally projecting therefrom and coupled thereto by a 15° bead seat 22. A circumferentially continuous cylindrical band 24 has a diameter which is less than that of rim base 18 and is coaxially integrally connected thereto by the radially outwardly and axially inwardly angulated shoulder 26. A circumferential array of axially extending air bleed passages or channels 34 (FIGS. 1 and 3) are formed as radial depressions in the cylindrical outer surface of band 24 at a preferred spacing for an 8 bolt wheel at substantially 45°. As best seen in FIG. 3, channels 34 extend axially throughout the cylindrical portion of band 24 but not into the angulated shoulder 26. The function of air bleed passages 24 is set forth in more detail in the aforementioned Strader U.S. Pat. No. 4,481,997 and not discussed further herein.

A wheel mounting disc generally indicated at 28 is integral with an edge of band 24 remote from flange 22, and includes hub opening 30 and mounting bolt openings 32 for mounting wheel assembly 10 on a vehicle in the usual manner.

Wheel assembly 10 further includes a second rim segment 36 which comprises a cylindrical hoop 38 adapted to be slideably and telescopically received over band 24, and an outboard bead retaining flange 40 integrally joined to hoop 38 by the outboard 15° bead seat 42. A lip 44 projects axially inwardly and radially outwardly from the flange-remote edge of band 38 for sealingly capturing in assembly against shoulder 26 an annular resilient O-ring seal 46. A plurality of threaded studs 48 are affixed on rim segment 16 and project axially outwardly therefrom through corresponding openings 50 in disc 28, studs 48 being secured by press fit of a splined portion 51 into associated opening 50 until the stud head 53 abuts disc 28. An annular clamping ring 52, welded at its outer edge to rim segment 36, is received over the outboard ends of studs 48, and a plurality of flanged lock nuts 54 are threadably received over the corresponding stud ends, for clamping rim segment 36, via the clamping ring 52, onto rim segment 16, with O-ring 46 being captured in compression between lip 44 and shoulder 26.

In accordance with one important feature of the present invention, safety insert 14 comprises a channel-section sheet metal base and beadlock annulus 60 extending around rim base 18. Annular band 60 has a central bight portion 62 which in the embodiment illustrated extends generally axially of the wheel assembly with a flat configuration. Bight portion 62 is integrally joined at its axially outer edges to flanking radially in-turned leg portions 64 and 66 which diverge from one another radially inwardly of the wheel at an angle of, for example, 50° relative to the wheel axis. Leg portions 64,66 are integrally joined through associated return bend portions 68 and 70 with radially in-turned toe portions 72 and 74 which converge with one another radially inwardly of the wheel at an angle of, for example, 15° relative to the radial plane of the wheel (i.e., at an angle 75° relative to the wheel axis). Toe portions 72 and 74 terminate at inner peripheral edges 76 and 78, respectively, which are dimensioned to have a slight clearance relative to the associated bead seats 42 and 22 of rim 16 to facilitate insert-to-wheel assembly and disassembly, but which may (or can) make contact with the rim bead seats under radially inwardly directed loading in a run-flat state. The radially inwardly extending toe portions 72 and 74 may have other angulations relative to one another as necessary to match the angle of the interior side wall of the associated tire bead.

Toe portions 72 and 74 frictionally engage and are axially compressed to bear tightly against the interior faces of bead toes 80 and 82, respectively, of tire 12 and clamp such bead toes against corresponding outboard and inboard bead retaining flanges 40 and 20.

As best seen in FIGS. 2 and 4, insert band 60 is preferably constructed of two identical semi-circular segments 60a and 60b which are joined end-to-end by releasable fasteners such that toe portions 72 and 74 are tightly and non-rotatably frictionally clamped against the tire bead toes 80 and 82, which in turn are non-rotatably frictionally clamped against the rim flanges 40 and 20.

Each band segment 60a, 60b terminates at one end in a straight end edge 84 (FIGS. 2, 4, 5, 6 and 7) which lies in a radial plane coincident with the wheel axis. A pair of threaded studs 86 and 88 are press fit or are staked to prevent movement through associated axially spaced openings 87 and 89 in bight portion 62 located closely adjacent edge 84 of each of the associated bands 60a, 60b. The heads 90 of studs 86 and 88 are made relatively flat and thin so as to minimize protrusion thereof radially outwardly of bight portion 62, or may be of countersunk design to be flush, and the threaded shanks 92 of studs 86 and 88 protrude radially inwardly a given distance from the interior surface of bight portion 62.

Figure 5:
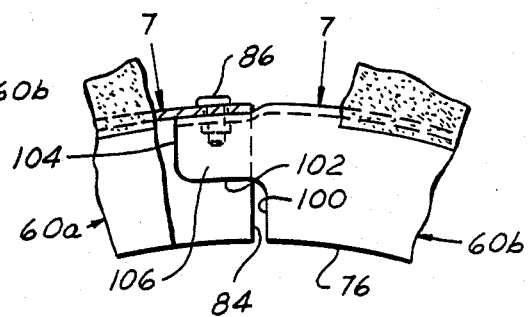
FIGS. 5 and 6 are fragmentary enlargements of the portions of FIG. 4 shown respectively in the circles labeled "5" and "6" therein.
Figure 6:
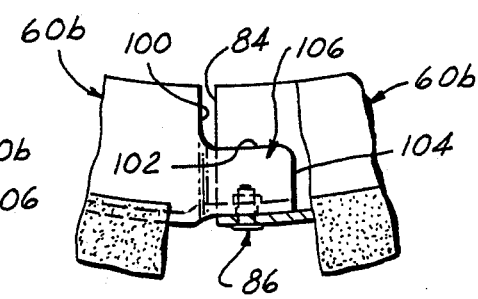
Figure 7:
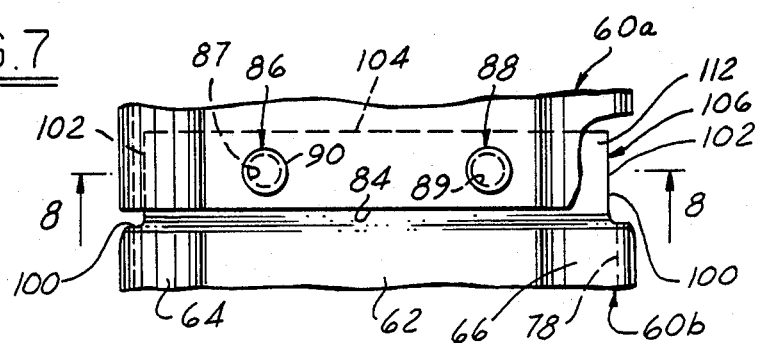
FIG. 7 is a fragmentary view of one of two safety insert joints taken in the direction of the arrow 7—7 of FIG. 5 and enlarged thereover to better illustrate detail.

The ends of bands 60a and 60b opposite ends 84 may have a specially formed locking tongue structure 106 (FIGS. 2 and 4-8) defined by edges 100 extending radially outwardly from the inner peripheral edges 76 and 78 through the toe portions 72 and 74 up into the leg portions 64 and 66, and then by circumferentially extending edges 102 which run to a free end edge 104 lying in a radial plane. In an exemplary band having an outside diameter of 20", the distance between edges 100 and 104 may be 1.2". Tongue 106 thus has a bight portion 108 and shortened leg portions 110 and 112, and the same are formed so as to be offset radially inwardly by the thickness of the metal stock of band 60. Alternatively, tongues 106 may be formed as a separate piece and permanently attached to the interior of the associated band by welding, for example, or releasably attached by bolts and nuts. Thus, as best seen in FIGS. 5 and 6, tongue 106 may be telescopically nested within the interior of the cooperating squared off end 84 of the other band segment to provide a smooth transition of the outer peripheral surfaces of the band segments at their joints. Tongue 106 is provided with a pair of holes 113 and 114 adapted to register with studs 86 and 88, respectively, when the band segments have been joined end to end with their respective tongues interiorly telescopically nested with a circumferential overlap as shown in FIGS. 2, 4, 5, 6, 7 and 8. To assemble the segments 60a and 60b within the tire, the segments are juxtaposed with their mating ends circumferentially overlapped and initially radially offset from one another, and with the studs 86 and 88 of segment 60a radially aligned with the holes 113, 114 of segment 60b, and the studs 86 and 88 of segment 60b radially aligned with the holes 113, 114 of segment 60a. The segments are then bodily shifted radially to slidably engage the studs at one end of each segment through the mating stud holes of the other end of each segment. It is then an easy matter to tread assocated flanged lock nuts 116 and 118 onto the threaded shanks 92 of studs 86 and 88 to firmly, but releasably, secure the band segments in end-to-end relationship to form the complete hoop as shown in FIGS. 2 and 4.

Preferably the band segments 60a and 60b are constructed from sheet steel stock, such as HSLA SAE 945 having a thickness dimension of, for example, 0.090", and are each preferably fabricated in production by a roll forming set up, or alternatively, in a stamping operation. In roll forming, the form rolls progressively impart the semi-circular shape to the band segments 60a, 60b, and also work the side edges of the bands into the leg portions 64,66 and toe portions 72 and 74 upon completion of the form roll pass-through of the segment, as will be well understood in the roll forming art. The locking tongues 106, stud securing holes 87 and 89 and stud clearance holes 113 and 114 are formed as a blanking and piercing operation. The radially inwardly offset of the tongue both radially and axially to provide the telescopic nesting is done in a final stamping operation after roll forming. As a last operation studs 86 and 88 are press fit or staked into the respective openings.

The sheet metal band 60 of safety insert 14 may, if desired, be used by itself as a safety insert in a safety tire and wheel assembly to serve primarily the function of a tire beadlock. As is well understood in the art, if the bead toes 80 and 82 of a tire 12 are held clamped against the associated rim flanges 40 and 20 by a beadlock device only, such as inner band 60 illustrated in FIG. 6 of the aforementioned Strader U.S. Pat. No. 4,481,997, protection is provided upon slow or fast deflation of the tire (i.e., blowout) to clamp the tire bead toes 80 and 82 firmly against the corresponding bead retaining flanges of the rim so that the tire will not become disassembled from the wheel as the vehicle is brought to a stop. However, such an application would not normally contemplate extended driving of the vehicle in a runflat condition.

In order to provide runflat operation for a variety of applications, the invention also contemplates as another feature the provision of a tire tread 120 preferably selected from one of three basic configurations illustrated as intermediate profile 120 in FIG. 1, a second, high profile embodiment 122 illustrated in FIGS. 2, 4, 5, 6 and 9, and a low profile tread 124 illustrated in FIG. 10. The rubber tire treads 120, 122, 124 are preferably made from a suitable elastomeric synthetic rubber material, such as those employed on tank wheel treads, such as but not limited to styrene-butadyene rubber, and are preferably molded and simultaneously bonded to the outer periphery of the band segments 60a and 60b in a suitable tire molding operation, by conventional and well understood techniques. Tire treads may be solid as in the case of the low profile tread 124, or may feature a circumferential center channel 126 in the case of treads 120 and channel 128 in the case of tread 122, which separates the outer surface of the tread into axially spaced segments 120a, 120b and 122a, 122b, respectively. This tread channel provides a wider safety insert for stability of the tire in deflated mode without the weight of a solid tread. It also has more compliancy against impacts in the inflated mode than would a solid tread. As best seen in FIG. 4, each 180° segment of the tire tread terminates in end surfaces 122c and 122d which lie in a radial plane flush with the associated band segment end edges 84 and 100. Hence, when safety insert 14 is assembled and secured into an operative full hoop, there is a slight gap between the juxtaposed ends of the tire tread segments.

In accordance with the present invention the two-piece band 60 which serves as the base and beadlock of safety insert 14 is made as a standard component common to any one of the three tread embodiment configurations employing the low, immediate or high profile tire treads. The thin rubber tread 124 is best suited for when safety insert 14 is intended primarily as a bead spreader or "beadlock" for low tire inflation applications. Such applications are used on military or off-road vehicles to provide additional flotation or footprint area of the tire and wheel assembly to better support the vehicle in driving over soft mud, sand or the like. Such applications require a low aspect ratio safety insert 14 to provide clearance between the safety insert and the interior surface of the tire at low inflation configurations of the tire, but the safety insert must nevertheless function to keep the tire bead seated both to maintain inflation of the tire at the desired low pressure and also to avoid tire-to-rim slippage.

Band 60 when provided with the intermediate profile tire tread 120 of FIG. 1 is best suited for use with radial tires to provide the same with adequate running clearance under normal operation at normal inflation pressure. The high profile tire tread 122 of FIGS. 2, 4 and 9 is provided on band 60 when the safety insert is to be employed on a safety wheel assembly equipped with bias type tires which require less running clearance under normal conditions due to their stiffer side wall construction. Other factors affecting the choice of tread type are the overall weight of the safety wheel and insert assembly which may be permitted for a given vehicle application, as well as the resilience characteristic of the safety insert to meet compliancy requirements. In general, the intermediate profile tire tread 120 presently has the most widespread application.

From the foregoing description it will now be understood that a safety wheel and tire assembly with the improved safety insert of the present invention provides a simple, light weight and easily field servicable runflat device with improved beadlock capabilities for tubeless tires used with take-apart wheel assemblies of the aforementioned Strader patent type. Safety insert 14 enables the vehicle equipped with such tire and wheel assemblies to continue traveling with one or more deflated tires at a limited speed and for a limited distance, such as a minimum of thirty miles at 30 m.p.h. for the embodiments illustrated herein. The safety insert construction of the invention also has an improved compliancy feature which results in reduced tire damage from impacts produced by running over sharp, hard obstacles which impact the tire between an obstacle and the safety insert.

The rigid or semi-rigid base band 60 when made of the aforementioned sheet steel material and to the cross sectional configuration illustrated herein has a high strength-to-weight ratio due to the compressive pre-stressing during tire/wheel assembly but is capable of flexing under stress produced by the radially inwardly directed forces generated by the tire running in a runflat mode as shown in FIG. 9. Such loading will tend to radially inwardly depress the central bight portion 62 of the insert and produce a laterally spread-apart loading on leg portions 54 and 66 which cause the toe portions 68 and 70 to increase their squeeze pressure against the associated tire bead toes 80 and 82 to even more firmly lock the same against the associated rim flanges 40 and 20. This action is synergistic in that it occurs precisely where and when needed to prevent loss of tire beads from the rim during runflat operation. Although band 60 itself thus contributes to the compliancy capability of the safety tire and wheel assembly, most of the compliancy characteristics of the wheel and tire assembly is contributed by the provision of the more flexible compliant elastomeric material of the tire treads 120, 122 or 124 carried by the band, and which may be affixed thereto by casting, molding, adhesive or other modes of attachment.

The safety insert 14 is designed to be somewhat flexible in its free state and, due to its two-part multi-piece construction, can be easily inserted into the tire and readily joined together by the simple interlocking of the tongues 106 with the fasteners 86 and 88. Alternatively, safety insert 14 could be made in one piece and inserted into a tire by compressing the device to fit between the tire bead opening into the tire, although this alternative is presently deemed less preferable. Although band 60 is preferably constructed of the aforementioned HLSA steel sheet material, it is also possible to construct the same of a suitable sheet aluminum alloy of suitable strength and section to serve the primary function of band 60, namely, to provide a base or bridge for the more flexible and compliant outer tire tread material and to spread or position the tire beads to form a "beadlock" which keeps the tire beads seated during low inflation or air-out running modes so that the tire/wheel assembly may continue to provide drive and braking torque. Band 60, due to its channel-shaped, open configuration with divergent legs and "over-sized" toes which are compressively pre-stressed in assembly, provides a high strength-to-weight ratio bridge for supporting the heavier compliant elastomeric material of the tire tread, thus making the total safety insert composite construction weight efficient.

As an alternative to sheet metal material as specified previously, the material of the band or base 60 may alternatively be formed in casting or molding operations from suitable metallic material or even from composite plastic or other structural materials having requisite strength-to-weight ratios for certain applications. However, cost factors presently favor the preferred sheet metal roll formed embodiments illustrated and described herein.

As indicated previously, the runflat base or band 60 may be used alone if desired for its beadlock and limited runflat capability, but preferably includes the resilient tread material for greater impact shock compliancy under normal and runflat conditions and to absorb and distribute the impact so as to protect the tire from fracture or penetration. The elastomeric material of the tire treads may itself be reinforced, or modified with weight-saving cavities, if desired. However, a preferred embodiment of tire tread for the safety insert includes one or more circumferential grooves, such as 126 and 128, for use with various runflat lubricant systems and devices. The tire tread groove provides a circumferential cavity to retain such lubricant in the proximity of the tire-to-safety insert interface, and reduces the "squeegee" effect of the flat surface engagement between the interior of the tire and the running surface of the tire tread which can reduce the efficacy of the lubricating action. Also, the resilient elastomeric material of the tire treads can be constructed in one or more layers of compounds. Preferably a known elastomeric tire tread material is chosen having attributes of high heat resistance, low friction, good impact absorption, good fatigue and wear resistance, low hysteresis, and other chemical and physical properties to best perform both the runflat and impingement functions and resist the adverse environment inside the tire cavity in a runflat mode.

Under actual road and field vehicle testing of a safety wheel and tire assembly utilizing the improved safety insert of the present invention, the insert was found to be extremely easy to insert into the tire and assemble. Good fit to the wheel rim was obtained and the metal parts of the safety insert showed no apparent failure or fatigue problems. The configuration of FIG. 1 with the intermediate tread profile of tread 120 in combination with a bias tire showed the best performance for spike test impingement.

Such testing has also shown that the safety insert construction of the present invention has good compliancy in both radial inwardly and laterally divergent directions. These improved results are believed to be due both to the use of the channel configuration and shape of the steel band 60 as well as the compliant rubber tread carried thereby. The single center groove, two-leg configuration of tire treads 120 and 122 have been found to be preferable over a solid tread. The center groove reduces the weight of the tire tread and enables each leg of the tread to better dissipate hysteresis heat build-up in the tread so as to run cooler due to the increased surface area of the tire tread. In addition, the two-legged tread operates with greater flexibility because each leg has a greater degree of freedom of movement, i.e., the same can move both laterally and radially when running in a runflat condition over rocks, scrap metal, etc. The two-legged tread also provides a wider base for stability in deflated operation without a consequent weight gain.

The foregoing features and advantageous of the invention may be further highlighted by comparison with the prior art Ippen et al U.S. Pat. No. 4,467,852 issued Aug. 28, 1984. Ippen et al approached the problem of runflat capability by providing a specially constructed tire expressly having a low height to width ratio (low aspect ratio) as compared to tires of standard construction, and which, in a modification illustrated in FIG. 3 of the Ippen et al patent, also includes a metal or plastic encircling supporting ring 10 which rests on the rim of the wheel. The supporting ring 10 as illustrated has a channel-shaped configuration in radial cross-section, with a generally flat center or bight portion terminating at its outer edges in slightly (about a 15° angle to the wheel axis) downwardly (radially inwardly) sloping leg portions, which in turn terminate in radially inwardly extending toe portions. These toe portions form sidewalls which are stated to rest firmly on the inside surface of the associated tire sidewall 5a. However, in Ippen et al, the supporting ring 10, like the associated tire, also has a low height to width ratio (low aspect ratio), namely about 1:8, or 12.5% as shown. Ippen et al also provides large elastomeric ribs 5b molded into the interior surface of the tire which, in a runflat mode, may contact the support ring 10.

By contrast, the present invention provides a runflat insert base/beadlock 60 having its own tread 120 or 122 vulcanized onto the insert outer periphery, and it is constructed of light-weight, high-strength sheet steel material with a relatively high height-to-width ratio of about 1:3.4, or 29.4% as shown herein (high aspect ratio) and with flexibility so as to provide a high compliance runflat support capable of withstanding sudden deflation and/or sharp impacts simulated by spike test specifications so as to reduce or prevent damage to a conventional radial or bias constructed tire when fitted on a conventional take-apart wheel construction of current manufacture. Due to these features, base/beadlock 60 is operable to provide higher bead-to-rim locking forces with higher loads (radially inwardly directed compression loads from the tire bearing against the highly arched base/beadlock which are simultaneous in timing and location to imposition of the load).

Moreover, as indicated previously, the free edges or toes 72, 74 of insert 60 are compressed or flexed toward one another axially of the wheel during assembly of the tire to the wheel to provide the beadlock function, i.e., preventing slippage of the tire on the rim so that drive and braking torque are transmitted to the tire which in turn prevents unseating of the tire beads when operated in deflated condition. For example, in this embodiment the free edges or toes 72, 74 are axially compressed to move 0.040 to 0.100 inches toward one another from their free state position. This pre-stressed nature of the annulus 60 due to axial compression of the same during assembly affords a greater economy of material over the Ippen et al patent because the pre-stressing is in direct opposition to imposed runflat loads. Thus, as compared to the Ippen et al low aspect ratio supporting ring 10, the runflat insert annulus 60 of the present invention is constructed with a high aspect ratio, as will be evident from FIGS. 1, 8, 9 and 10 of the drawings (which are to scale), such that the central bight portion 62 is spaced farther radially outwardly away from the rim bead seats 22, 42, and the leg portions 64 and 66 which slope steeply radially inwardly of the wheel, at an angle of at least about 50° relative to the wheel axis. This high aspect ratio channel-shaped base 60 is constructed of thin (0.090″) high strength sheet steel to afford the greatest economy of material which, due to its flexibility under the axial compression achieved during assembly with the tire and wheel, is pre-stressed throughout its bridge-like spring structure. This inward squeeze or deflection of the free edges or toe portions 72, 74, resulting from being tightly non-rotatably frictionally clamped against the tire bead toes 80, 82, induces a bending moment in the cross-sectional width of the central bight portion 62. This moment puts the outer surface of the metal of base 60 in tension stress and the inner surface in compression stress. When base 60 assumes the radial load imposed by the tire 12 collapsing upon it due to lack of inflation pressure, it is displaced radially inwardly, causing an opposite bending moment to that achieved during the tire/wheel insert assembly which, as indicated previously, occurs when the toe portions 72 and 74 are frictionally engaged and bear tightly against the interior faces of bead toes 80 and 82, respectively, of tire 12, when the rim is fully tightened to clamp such bead toes against corresponding outboard and inboard bead retaining rim flanges 40 and 20.

As will be readily understood by those skilled in this art from the foregoing disclosure, it is this direct opposition of moments within the single, relatively high aspect ratio, arched structure of base 60 which affords the economy of material. Without this high aspect ratio bridge or arch configuration in combination with the flexibility of the steel material of the base, and the consequent pre-stressing in assembly in opposition to the imposed deflated tire load, such tire load would have to be assumed wholly by the base 60. As such, the base would have to be quite thick and heavy to resist this load. By pre-stressing in the opposite direction initially, this pre-stress must first be overcome before the base assumes the tire load. In short, when starting from a negative position (the initial compressive pre-stress), one may travel further in the positive direction before the positive limit is reached than if one begins at zero. Thus, the material thickness may be less when the base is pre-stressed properly than if it is not pre-stressed. This in turn affords the greatest economy of material and hence reduced weight and cost. The aspect ratio of the beadlock portion 60 of safety insert 14 is dependent upon a number of factors. As indicated previously, the beadlock aspect ratio is the ratio of the height-to-width of the metal channel 60, the width measurement being taken between the channel "knees" or return bend portions 68 and 70 measured axially of the wheel across the cross-section of channel 60, the height measurement being taken from a line drawn axially of the wheel connecting the free edges of the toe portions 72, 74 of beadlock 60 and measuring from this line radially outwardly to the central bight portion 62 of the beadlock band 60.

A first factor to consider is the desired aspect ratio of the completed safety insert 14, which is the ratio of the aforementioned knee width dimension of band 60 as the ratio denominator and the total height measured from the aforementioned line drawn between the free edges of toes 72 and 74 radially outwardly to the outer peripheral surface of the treads 120, 122 or 124, the total radial height of the band 60 plus the associated compliant treads. This desired aspect ratio of safety insert 14 is dependent upon the deflection of the carcass of tire 12 when used at the specified vehicle load and inflation. Typically the total radial height of safety insert 14 should range between 35 and 65% of the free height available inside the tire under these conditions. This is determined by the degree of support required to achieve a specified mileage when operated in a deflated condition before the tire becomes degraded sufficiently to immobilize the vehicle.

For example, in the embodiment shown in FIG. 9, tire 12 has an inside free height of approximately seven inches from the rim bead seats 22, 42 radially outwardly of the wheel to the inside of the tire carcass at rated load and inflation. An aspect ratio of safety insert 14 of about 65% was chosen for this application to achieve at least the specified minimum mileage life (30 miles at 30 miles per hour) when operated in the deflated mode. This safety insert aspect ratio is based upon an overall radial height of about 4.75 inches divided by a band width of 7.08 inches.

Then certain amount of deflection occurs to the tire carcass when the vehicle is operated over a rough terrain with inflated tires. It is desired to allow this deflection of the tire carcass to occur relatively unimpeded so that tire punctures do not occur from the anvilling effect when has been observed with rigid-type safety inserts. The ability to absorb this shock is known from the spring rate of the compliant portion of insert 14, namely the elastomeric rubber tread 120, 122, 124 or equivalent, and hence the height required for the compliant portion can be determined. For the example shown in FIG. 9, the shape and material used in the compliant portion 122 produce sufficient deflection from shock at vehicle load and inflation ratings when the compliant portion 122 is three inches in height (radially of the wheel) above the beadlock portion 60. The remaining difference in height between the height of the compliant portion 122 and the aspect ratio height of the completed insert 14 (band 60 plus tread 122) then determines the height of the beadlock portion 60. This is the first estimation of the radial height of beadlock portion 60.

In this example, the 4.75 inch safety insert aspect ratio height less the compliant portion height of three inches leaves 1.75 inches as the height for the beadlock portion 60. It is to be understood that the tire size designation for a bias-ply type tire in this example is $36 \times 12.5$–$16.5$ (i.e., outside diameter of 36 inches; maximum width of tire inflated of 12.5 inches; bias-ply type construction; 16.5 inch bead seat diameter). However, the embodiment of FIG. 9 may also be used with radial type tires, and in the embodiment example given the radial tire size designation would be $37 \times 12.5$ R $16.5$. The aspect ratio of the beadlock portion 60 in this embodiment would thus be the beadlock height of 1.75 inches divided by the free-state width of band 60 of 7.08 inches to provide a beadlock aspect ratio of about 25%.

Secondly, the amount of pre-stress compression (deflection of toes 72 and 74 toward one another axially of the wheel) of the tire bead toes 72 and 74 when assembled with the tire and wheel must be determined. This compression must simulate the amount of axial force that is achieved by the air inflation pressure above a point just before tire-to-wheel slip can be induced by high wheel torques. This is determined empirically by systematic reduction of tire pressures while the vehicle is displaying high wheel torque, such as when hill climbing. For the example in FIG. 9, slippage occurred in the range of 8 to 12 psi (gauge). The axial force can then be estimated by multiplying the pressure in psig below which tire slippage occurs by the projected tire sidewall area that acts upon the wheel rim flange, usually one-half the tire sidewall height measured radially outwardly from the tire bead. For the example in FIG. 9, a sidewall area of approximately 200 square inches multiplied by 12 psi equals 2650 pounds of axial force required from the beadlock portion 60 to prevent tire slippage at low or no inflation modes. Proposed beadlock portion shapes having the flat bight 62, legs 64 and 66 and toes 72 and 74 may then be tested, either empirically or by computer analysis methods, to produce this axial force while at the same time causing the pre-stressing condition of the beadlock sheet metal channel 60 as shown in FIG. 11, the radial height of band 60 being balanced against the earlier requirement of the radial compliant portion 122 of insert 14. In general, the higher the aspect ratio of insert 14, the longer will be the run mileage under low pressure or deflated modes, but the greater will be the likelihood of damage to the insert from transient high shock impacts when the vehicle is running over sharp ground objects such as rocks, etc.

Referring in more detail to FIG. 11, it will be seen that the axial width taken to the outside surface of knees 68 and 70 is 7.08 inches in the free-state condition of band 60 and that the free-state radial height of band 60 taken from the inner peripheral edges of toes 72 and 74 when connected by a straight line therebetween and measured radially outwardly therefrom to bight portion 62 is 1.90 inches (20.00 inches minus 16.20 inches equals 3.80 inches divided by two equals 1.90 inches). The aspect ratio of band 60 as shown in FIG. 11 is thus 1.90 inches divided by 7.08 inches to produce an aspect ratio of 26.8 percent. When band 60 is assembled on wheel 10 and put under the pre-stress compression and assembly with tire 12 as shown in FIG. 1, band 60 will be stress deflected to the phantom position illustrated in FIG. 11 by the dashed lines, the phantom position being shown on an exaggerated scale to better illustrate the deflection axially of the wheel of toes 72 and 74 toward one another and the corresponding deflection of bight portion 62 upwardly into a slight arched configuration as toe 72 and 74 are axially squeezed together in assembly. It will be noted from FIG. 11 that the axial width dimension between the outside of the knee 68 and 70 has been reduced from the free-state dimension of 7.08 inches to a deflected approximate dimension of 6.96 inches, indicating a total axial deflection of knee 68 and 70 toward one another of 0.120 inches, or 0.060 inches movement of each knee into the stress assembled condition.

It is also to be understood that the beadlock portion 60 alone may be used if the tire supporting compliant portion 120, 122 or 124 is not desired. This is usually the case for vehicles intended to be operated on extremely soft soils on occasion. Most often, these vehicles are equipped with a tire inflation level control system which allows adjustment of tire pressures by means of a control located within the cab of the vehicle. The operator may select high pressures for highway usage, and lower pressures for cross-country or sand and mud usage. Such systems have very high tire carcass deflection at the low pressures, as high as 60%, and often do not have free height left for addition of the compliant portion 120, 122 or 124. In this case, the beadlock band 60 only is used for the previously stated reasons. The bolts attaching the beadlock halves together may then be loose instead of staked or press-fitted in place to reduce cost. This is because elimination of the compliant portion allows access to the bolt heads.

Referring to FIG. 12, the same illustrates to scale an engineered design for use as a beadlock alone, the same reference numerals raised by a prime suffix being employed to indicate elements alike in function to those previously described with respect to band 60. Band 60' of FIG. 12 is designed for use on a 20×10 rim size and for a tire size desgination of 1400R20. Note that the free-state width between the inner peripheral edges of toes 72' and 74' is 7.20 inches, which forms the widest axial dimension of band 60' due to the toes 72' and 74' in the free-state condition being slightly divergent at an angle of 3.43 degrees relative to the radial plane of the wheel. The aspect ratio of band 60' is thus the radial height of band 60' of 1.95 inches (24.00 minus 20.10 equals 3.90 divided by 2 equals 1.95 inches) divided by 7.20 inches to produce an aspect ratio of 27%. Note however that in band 60' for this different size wheel application to serve as a beadlock only legs 64' and 66' are angled at 35° rather than 50° of band 60 relative to the axis of the wheel.

It will also be understood that based upon the above parameters and working examples, it has been found that the optimum aspect ratio of the beadlock portion 60 of safety insert 14 ranges between 20 to 30%, with the higher end of this range being found to be optimum for most of the applications discussed above.

Prior art safety inserts have been rigid devices which may work well on smooth paved surfaces in the deflated tire state but do not fair as well when run cross-country, because upon striking an obstacle such as a rock or tree stump, the tire is deflected radially inwardly until it strikes the insert, and the energy imparted is often sufficient to puncture the tire carcass, causing a flat tire. By contrast, the present invention provides high compliancy to accommodate such shock loads, due also in part to the special tread 120 having the center channel 126. In addition, base 60 being made of the aforementioned sheet steel material in the high aspect ratio cross-sectional configuration illustrated herein not only has a high strength-to-weight ratio, but is also capable of flexing under the stresses produced by the radially inwardly directed forces generated by the tire running off-highway in a runflat mode (shown in FIG. 9). Moreover, such loading will tend to radially inwardly depress the center bight portion 62 of the insert and produce the lateral spread-apart loading on leg portions 54 and 66, which cause the toe portions 68 and 70 to increase their squeeze pressure against the associated tire bead toes 80 and 82, thereby even more firmly locking the same against the associated rim flanges 40 and 20. Thus, unlike the prior art safety tire and rim constructions, including that of the aforementioned Ippen et al patent, safety insert assembly 14 is designed to be somewhat flexible in its free state. This feature also cooperates with the two-part, take-apart construction of insert 14 so that the same can be easily inserted into the tire and readily joined together by the simple interlocking of the tongues 106 with the fasteners 86 and 88.

It is also to be understood that, although the foregoing description and drawings describe and illustrate in detail various successful working embodiments of the present invention, to those skilled in the art to which the present invention relates, the present disclosure will suggest many modifications in construction as well as widely differing embodiments and applications without thereby departing from the spirit and scope of the invention. The present invention, therefore, is intended to be limited only by the scope of the appended claims and the applicable prior art.

We claim:

1. In a safety tire and wheel assembly comprising a vehicle wheel including a take-apart wheel rim having axially spaced bead flanges and a rim base, a tire of standard radial or bias construction having axially spaced bead toes and a circumferential tire tread, and safety runflat insert means comprising base-beadlock means extending circumferentially around said rim within an air chamber surrounded by said tire and rim and having axially spaced side edges clamping said bead toes against said bead flanges, the improvement wherein said insert means comprises an annulus constructed of relatively thin sheet metal of generally channel shape in radial cross section open at its radially inner periphery between said side edges and having a relatively high aspect ratio, said annulus having a generally central bight portion extending generally axially and bounded by radially in-turned leg portions, said leg portions diverging relative to one another radially inwardly towards said tire bead toes at an angle of about at least 50° relative to the axis of said wheel and terminating in toe portions extending generally radially inwardly relative to said leg portions, the outer surfaces of said toe portions bearing generally flat against the interior surfaces of said tire toe beads such that said annulus is pre-stressed by deflection of said toe portions towards one another axially of said wheel such that said channel is stressed in direct opposition to stresses imposed on said channel when side tire is operated to run on said rim without inflation pressure in said air chamber, and an elastomeric tread bonded to the outer surface of said central bight portion, said tread comprising a substantially complete annulus bonded to at least said bight portion of said annulus and extending radially outwardly therefrom a predetermined distance to have a clearance with the interior surface of the tire under normal running conditions, said tire tread having a circumferential center groove therein defined by two laterally spaced circumferentially extending radially outwardly protruding leg portions, said annulus comprising a pair of semi-circular members having interengageable mating ends releasably interconnected at said mating ends to form a complete annulus.

2. The combination set forth in claim 1 wherein said central bight portion is generally flat and extends parallel to the axis of said wheel.

3. The combination set forth in claim 2 wherein said toe portions converge relative to one another so as to extend at an angle of about 75° relative to the axis of said wheel.

4. The combination set forth in claim 1 wherein said toe portions each terminate in a free edge having a slightly greater diameter than the juxtaposed portion of said rim base.

5. The combination set forth in claim 4 wherein each of said members has a tongue extending from one of its opposite ends overlapping the mutually interengaged other end of the associated member, and disconnectable fastener means fixed to said other end of said associate member coupled to said overlapped tongue to fixedly secure said members into said annulus.

6. The combination set forth in claim 5 wherein said tongue is offset slightly radially inwardly from the junction thereof with said member so as to overlap the associated member on the radially inwardly facing interior surface thereof.

7. The combination set forth in claim 6 wherein said fastener means comprise a pair of headed studs fixed to said other end of each of said members and each having a threaded shank extending radially inwardly therefrom, each of said tongues having registering holes receiving said threaded shanks therethrough, and nut means threaded onto said studs to secure the connection of said members.

8. The combination set forth in claim 1 wherein said elastomeric tread is selected from the group consisting of a tire tread having an intermediate profile adapted for use with radial tires and having a center groove circumferentially extending therearound bounded by two radially outwardly protruding leg portions, and a high profile tread design for use with bias tires also having a circumferentially extending center groove defined by two radially outwardly protruding leg portions.

9. The combination set forth in claim 1 wherein said sheet metal comprises HSLA steel stock roll formed to provide said bight portions, leg portions and toe portions as integral portions of a single piece of sheet metal.

10. A safety runflat insert for use in a tire and wheel assembly having a take-apart multi-piece wheel rim with axially spaced bead flanges and a rim base and a tire of standard radial or bias construction having axially spaced bead toes for mounting on the rim and a circumferential tire tread, said safety runflat insert comprising base-beadlock means adapted to extend circumferentially around said rim within an air chamber surrounded by said tire and rim and having axially spaced side edges for clamping said bead toes against said bead flanges, said insert comprising an annulus constructed of relatively thin sheet metal of generally channel shape in radial cross section open at its radially inner periphery between said side edges and having a relatively high aspect ratio, said annulus having a generally central bight portion extending generally axially and bounded by radially in-turned leg portions, said leg portions diverging relative to one another radially inwardly towards said tire bead toes at an acute angle relative to the axis of said wheel and terminating in toe portions extending generally radially inwardly relative to said leg portions, the outer surfaces of said toe portions bearing generally flat against the interior surfaces of said tire toe beads, the free state width axially of said insert between said toe portions being greater than the width axially of the tire bead interior surfaces when in assembly with the rim and said insert such that said annulus is pre-stressed by deflection of said toe portions towards one another axially of said wheel such that said channel is stressed in direct opposition to stresses imposed on said channel when side tire is operated to run on said rim without inflation pressure in said air chamber.

11. The insert as set forth in claim 10 wherein said free state toe portion width is correlated with said channel shape and material to produce by deflection of said insert in said assembly a compression prestress sufficient to develope a rim-clamping force on said tire beads to prevent slippage between said tire and rim under high rim-exerted torque at low or deflated tire inflation pressures.

12. The insert as set forth in claim 11 further including in combination therewith an elastomeric tread bonded to the outer surface of said central bight portion, said tread comprising a substantially complete annulus bonded to at least said bight portion of said annulus and extending radially outwardly therefrom a predetermined distance adapted to have a clearance with the interior surface of the tire under normal running conditions.

13. The combination set forth in claim 13 wherein said tire tread has a circumferential center groove therein defined by two laterally spaced circumferentially extending radially outwardly protruding leg portions, said annulus comprising a pair of semi-circular members having interengageable mating ends releasably interconnected at said mating ends to form a complete annulus.

14. The combination set forth in claim 11 wherein said central bight portion is generally flat and extends parallel to the axis of said wheel.

15. The combination set forth in claim 14 wherein said toe portions converge relative to one another so as to extend at an angle of about 50° relative to the axis of said wheel.

16. The combination set forth in claim 15 wherein said toe portions each terminate in a free edge having a slightly greater diameter than the juxtaposed portion of said rim base.

17. The combination set forth in claim 12 wherein said elastomeric tread is selected from the group consisting of a tire tread having an intermediate profile adapted for use with radial ply tires and having a center groove circumferentially extending therearound bounded by two radially outwardly protruding leg portions, and a high profile tread design for use with bias ply tires also having a circumferentially extending center groove defined by two radially outwardly protruding leg portions.

18. The combination set forth in claim 11 wherein said sheet metal comprises HSLA steel stock roll formed to provide said bight portions, leg portions and toe portions as integral portions of a single piece of sheet metal.

19. The safety runflat insert of claim 11 wherein said toe portions are adapted to extend at an angle generally parallel to the associated interior surfaces of the tire toe beads when in assembly therewith, said annulus comprising a pair of semi-circular members having interengageable mating ends releasably interconnected at said mating ends to form a complete annulus, said insert annulus being constructed of sheet metal comprising HSLA steel stock roll formed to provide said bight portions, leg portions and to portions as integral portions of a single piece of semi-circular sheet metal.

20. The insert as set forth in claim 19 wherein said leg portions extending at an angle of between about 35° to 75° to the axis of said annulus.

21. The insert as set forth in claim 20 wherein said aspect ratio of said channel shape ranges between about 20 to 30%.

22. The insert set forth in claim 21 wherein said range is about 25 to 30%.

23. The insert as set forth in claim 20 wherein said aspect ratio of said channel shape is about 27%.

* * * * *